United States Patent
Araki et al.

(10) Patent No.: US 12,501,714 B2
(45) Date of Patent: Dec. 16, 2025

(54) SEMICONDUCTOR DEVICE, POWER MODULE, INVERTER DEVICE, AND ELECTRIC VEHICLE

(71) Applicant: Hitachi Astemo, Ltd., Hitachinaka (JP)

(72) Inventors: Takahiro Araki, Tokyo (JP); Akira Mima, Tokyo (JP); Noriyuki Maekawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 576 days.

(21) Appl. No.: 17/911,962

(22) PCT Filed: Jan. 15, 2021

(86) PCT No.: PCT/JP2021/001184
§ 371 (c)(1),
(2) Date: Sep. 15, 2022

(87) PCT Pub. No.: WO2021/192530
PCT Pub. Date: Sep. 30, 2021

(65) Prior Publication Data
US 2023/0148137 A1 May 11, 2023

(30) Foreign Application Priority Data
Mar. 23, 2020 (JP) .................. 2020-051598

(51) Int. Cl.
*H10D 89/60* (2025.01)
*H10D 8/25* (2025.01)

(52) U.S. Cl.
CPC ............ *H10D 89/611* (2025.01); *H10D 8/25* (2025.01)

(58) Field of Classification Search
None
See application file for complete search history.

(56) References Cited

U.S. PATENT DOCUMENTS

| | | | |
|---|---|---|---|
| 6,373,731 B1 * | 4/2002 | Iwamura | H02M 7/5387 363/56.05 |
| 7,742,270 B2 * | 6/2010 | Otto | H02H 9/008 361/103 |

(Continued)

FOREIGN PATENT DOCUMENTS

| | | |
|---|---|---|
| JP | 60-15720 A | 1/1985 |
| JP | 9-163583 A | 6/1997 |

(Continued)

OTHER PUBLICATIONS

International Search Report (PCT/ISA/210) issued in PCT Application No. PCT/JP2021/001184 dated Apr. 20, 2021 with English translation (five (5) pages).

(Continued)

*Primary Examiner* — Bilkis Jahan
(74) *Attorney, Agent, or Firm* — Crowell & Moring LLP

(57) ABSTRACT

There has been a problem that when a value of a current flowing through a thermistor increases, a voltage drop generated in the thermistor increases, and variations occur in a clamp voltage. A semiconductor device includes: a switching element that is on-off controlled; and a surge voltage protection circuit connected between a positive electrode side terminal of the switching element and a control terminal of the switching element. The surge voltage protection circuit includes a first Zener diode, a second Zener diode connected in series with the first Zener diode, and a temperature characteristic compensating element having a temperature coefficient different in polarity from the first Zener diode and the second Zener diode and connected in parallel with the second Zener diode.

7 Claims, 11 Drawing Sheets

(56) References Cited

U.S. PATENT DOCUMENTS

| | | | |
|---|---|---|---|
| 2007/0279106 A1 | 12/2007 | Bennett et al. | |
| 2009/0273868 A1* | 11/2009 | Liu | H10D 8/25 |
| | | | 361/56 |
| 2019/0286181 A1* | 9/2019 | Iwamizu | H10D 84/811 |
| 2020/0044560 A1* | 2/2020 | Nagano | H02M 3/156 |

FOREIGN PATENT DOCUMENTS

| | | |
|---|---|---|
| JP | 2004-247877 A | 9/2004 |
| JP | 2009-540631 A | 11/2009 |
| JP | 2019-47416 A | 3/2019 |

OTHER PUBLICATIONS

Japanese-language Written Opinion (PCT/ISA/237) issued in PCT Application No. PCT/JP2021/001184 dated Apr. 20, 2021 (three (3) pages).

* cited by examiner

SEMICONDUCTOR DEVICE, POWER MODULE, INVERTER DEVICE, AND ELECTRIC VEHICLE

TECHNICAL FIELD

The present invention relates to a semiconductor device, a power module, an inverter device, and an electric vehicle.

BACKGROUND ART

An inverter device mounted on an electric vehicle such as a hybrid automobile or an electric automobile uses a switching element that is on-off controlled. This switching element is desired to achieve both shortening of switching time and suppression of surge voltage. Therefore, a surge voltage protection circuit is provided between a positive electrode side terminal of the switching element and a control terminal of the switching element. The surge voltage protection circuit is set to operate at a voltage (clamp voltage) lower than a breakdown voltage between a drain and a source of the switching element, and when a surge occurs, the surge voltage protection circuit breaks down before the switching element to protect the switching element.

PTL 1 discloses a load control device in which a cathode of a Zener diode Z1 is connected to a drain of a MOSFET, an anode of the diode is connected to an anode of the Zener diode Z1, a thermistor is connected between a cathode of the diode and a gate of the MOSFET, and a fixed resistor is connected to the thermistor in parallel.

CITATION LIST

Patent Literature

PTL 1: JP 2019-47416 A

SUMMARY OF INVENTION

Technical Problem

The device described in PTL 1 has a problem that, when the value of the current flowing through the thermistor increases, the voltage drop generated in the thermistor increases, and variations occur in the clamp voltage.

Solution to Problem

A semiconductor device according to the present invention includes: a switching element that is on-off controlled; and a surge voltage protection circuit connected between a positive electrode side terminal of the switching element and a control terminal of the switching element. The surge voltage protection circuit includes a first Zener diode, a second Zener diode connected in series with the first Zener diode, and a temperature characteristic compensating element having a temperature coefficient different in polarity from the first Zener diode and the second Zener diode and connected in parallel with the second Zener diode.

Advantageous Effects of Invention

According to the present invention, it is possible to suppress the variation in the clamp voltage regardless of the current value.

DESCRIPTION OF EMBODIMENTS

Figure 1:
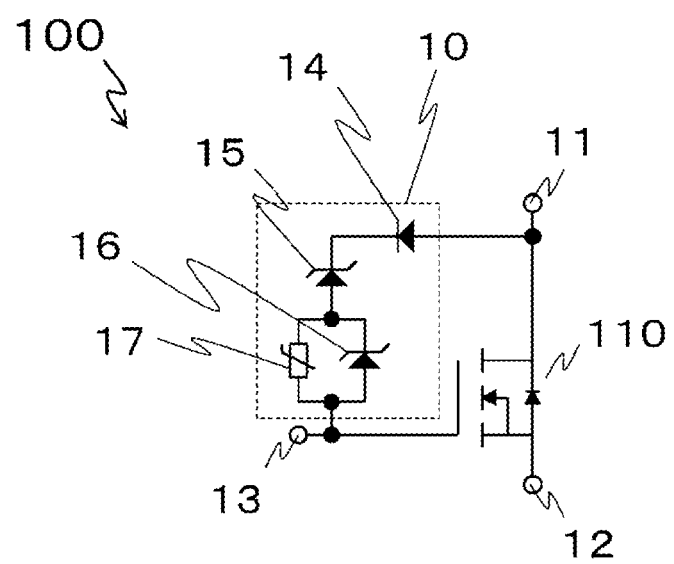
FIG. 1 is a circuit configuration diagram of a semiconductor device according to a first embodiment.

[First Embodiment] Hereinafter, an embodiment of the present invention will be described with reference to the drawings. However, the present invention should not be interpreted as being limited to the following embodiments, and the technical idea of the present invention may be realized by combining other known components. Note that, in the drawings, the same elements are denoted by the same reference numerals, and redundant description is omitted.

FIG. 1 is a circuit configuration diagram of a semiconductor device 100 according to the present embodiment.

A switching element 110 is configured by a metal oxide film field effect transistor (MOSFET), a combination of an insulated gate bipolar transistor (IGBT) and a diode, or the like, and includes a positive electrode side terminal 11, a negative electrode side terminal 12, and a control terminal 13.

The positive electrode side terminal 11 is connected to a positive electrode side of an inverter device (not shown), the negative electrode side terminal 12 is connected to a negative electrode side of the inverter device (not shown), and the control terminal 13 is connected to an inverter control device (not shown). In the switching element 110, on/off of a current flowing from the positive electrode side terminal 11 to the negative electrode side terminal 12 is controlled based on a control signal input to the control terminal 13.

A surge voltage protection circuit 10 is connected between the positive electrode side terminal 11 of the switching element 110 and the control terminal 13 of the switching element 110. In general, the surge voltage protection circuit 10 is configured by connecting a diode 14 and a first Zener diode 15 in series. In this configuration, it is assumed that a surge voltage generated between the positive electrode side terminal 11 and the negative electrode side terminal 12 by the switching of the switching element 110 exceeds the clamp voltage set by a Zener voltage of the first Zener diode 15. At this time, when the first Zener diode 15 is energized, a current flows from the positive electrode side terminal 11 to the control terminal 13, and the potential of the control terminal 13 is raised to protect the switching element 110 from the surge voltage.

In the present embodiment, as illustrated in FIG. 1, the surge voltage protection circuit 10 includes a diode 14, a first Zener diode 15, a second Zener diode 16 connected in series with the first Zener diode 15, and a temperature characteristic compensating element 17 having a temperature coefficient different in polarity from the first Zener diode 15 and the second Zener diode 16 and connected in parallel with the second Zener diode 16. The temperature characteristic compensating element 17 is, for example, a thermistor.

When the polarity of the temperature coefficient of the temperature characteristic compensating element 17 is different from that of the second Zener diode 16 and the second Zener diode 16 has a positive temperature coefficient, the temperature characteristic compensating element 17 has a negative temperature coefficient. That is, when the element temperatures of the second Zener diode 16 and the temperature characteristic compensating element 17 increase, the Zener voltage of the second Zener diode 16 increases, but the resistance value of the temperature characteristic compensating element 17 decreases. On the other hand, when the element temperatures of the second Zener diode 16 and the temperature characteristic compensating element 17 decrease, the Zener voltage of the second Zener diode 16 decreases, but the resistance value of the temperature characteristic compensating element 17 increases. As a result, when the element temperatures of the second Zener diode 16 and the temperature characteristic compensating element 17 are high, the current flowing through the surge voltage protection circuit 10 flows more to the temperature characteristic compensating element 17, and when the element temperatures of the second Zener diode 16 and the temperature characteristic compensating element 17 are low, the current flowing through the surge voltage protection circuit 10 flows more to the second Zener diode 16.

Therefore, the clamp voltage when the element temperatures of the second Zener diode 16 and the temperature characteristic compensating element 17 are high is calculated by following Equation (1), and the clamp voltage when the element temperatures of the second Zener diode 16 and the temperature characteristic compensating element 17 are low is calculated by following Equation (2).

$$V\text{clamp}=Vf+\text{VZD1}+\text{VNTC} \quad \ldots \quad (1)$$

$$V\text{clamp}=Vf+\text{VZD1}+\text{VZD2} \quad \ldots \quad (2)$$

Here, Vclamp is a clamp voltage of the surge voltage protection circuit 10, Vf is a forward voltage of the diode 14, VZD1 is a Zener voltage of the first Zener diode 15, VNTC is a voltage drop generated in the temperature characteristic compensating element 17, and VZD2 is a Zener voltage of the second Zener diode 16.

Figure 2:
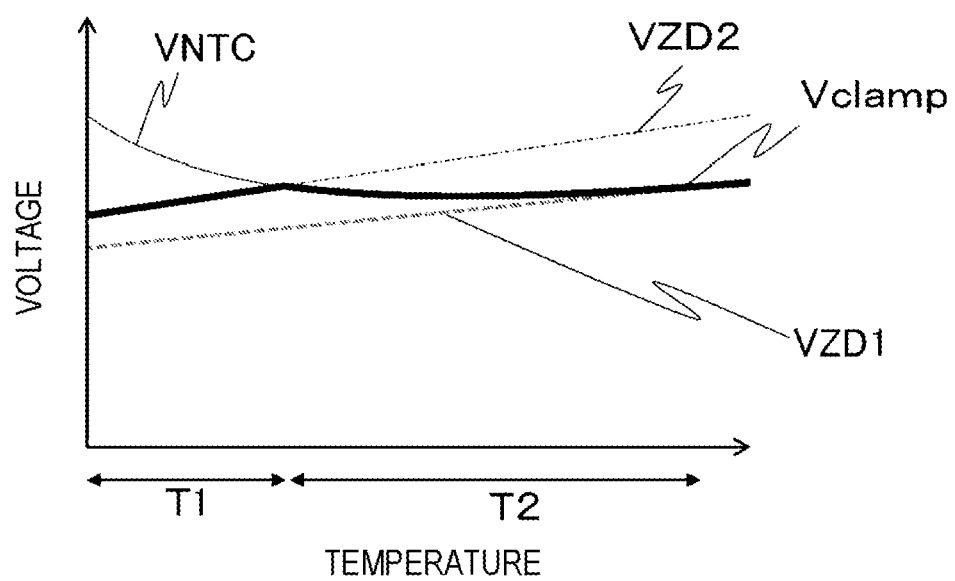
FIG. 2 is a diagram illustrating temperature characteristics of a clamp voltage according to the first embodiment.

FIG. 2 is a diagram illustrating a temperature characteristic of a clamp voltage according to the first embodiment. In FIG. 2, the horizontal axis represents temperature, and the vertical axis represents voltage.

When the temperatures of the second Zener diode 16 and the temperature characteristic compensating element 17 are low (T1 in FIG. 2), since the Zener voltage VZD2 of the second Zener diode 16 is low and the resistance value of the temperature characteristic compensating element 17 is large, the clamp voltage Vclamp is a sum of the Zener voltage VZD1 of the first Zener diode 15 and the Zener voltage VZD2 of the second Zener diode 16 as shown in Equation (2).

On the other hand, when the element temperatures of the second Zener diode 16 and the temperature characteristic compensating element 17 are high (T2 in FIG. 2), since the Zener voltage VZD2 of the second Zener diode 16 is high and the resistance value of the temperature characteristic compensating element 17 is small, the clamp voltage Vclamp is a sum of the Zener voltage VZD1 of the first Zener diode 15 and the voltage drop VNTC generated in the temperature characteristic compensating element 17 as shown in Equation (1). As a result, as compared with a general configuration using only the first Zener diode 15, fluctuation of the clamp voltage due to temperature change is suppressed.

Figure 3:
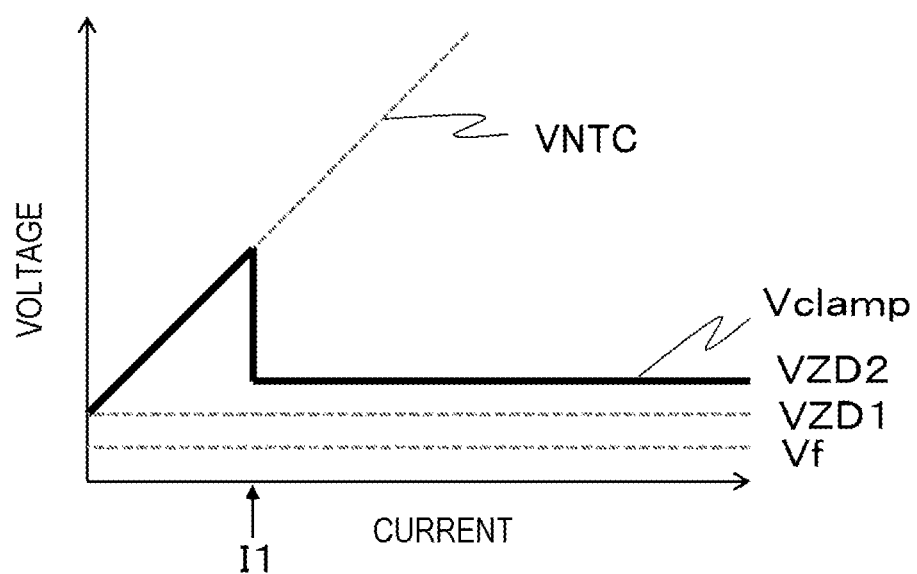
FIG. 3 is a diagram illustrating a current characteristic of a clamp voltage according to the first embodiment.

FIG. 3 is a diagram illustrating a current characteristic of a clamp voltage according to the first embodiment. In FIG. 3, the horizontal axis represents the current flowing through the surge voltage protection circuit 10, and the vertical axis represents the voltage of the surge voltage protection circuit 10. Vclamp is a clamp voltage of the surge voltage protection circuit 10, Vf is a forward voltage of the diode 14, VZD1 is a Zener voltage of the first Zener diode 15, VNTC is a voltage drop generated in the temperature characteristic compensating element 17, and VZD2 is a Zener voltage of the second Zener diode 16.

When the element temperatures of the second Zener diode 16 and the temperature characteristic compensating element 17 are high, since the Zener voltage VZD2 of the second Zener diode 16 is high and the resistance value of the temperature characteristic compensating element 17 is small, the current flowing through the surge voltage protection circuit 10 flows more to the temperature characteristic compensating element 17. Then, when the current increases, the voltage drop VNTC generated in the temperature characteristic compensating element 17 increases, and when the second Zener diode 16 exceeds the Zener voltage VZD2 at the current I1, the second Zener diode 16 is energized. As a result, it is possible to suppress an increase in the clamp voltage Vclamp when the current flowing through the surge voltage protection circuit 10 increases.

Figure 4:
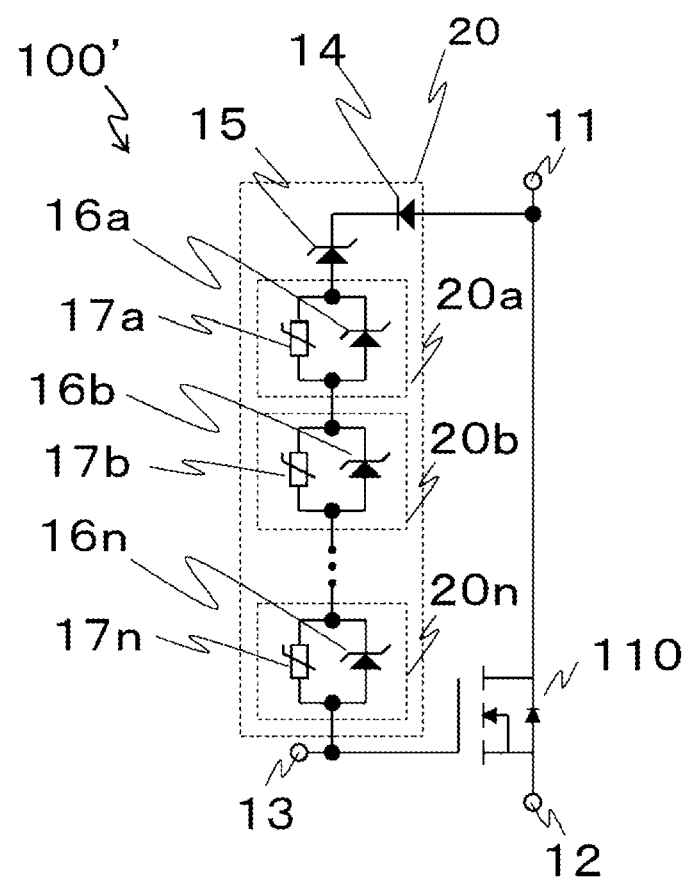
FIG. 4 is a circuit configuration diagram of a semiconductor device according to a second embodiment.

[Second Embodiment] FIG. 4 is a circuit configuration diagram of a semiconductor device 100' according to the second embodiment. The same portions as those of the first embodiment illustrated in FIG. 1 are denoted by the same reference numerals, and the description thereof will be omitted.

In the second embodiment, a surge voltage protection circuit 20 is configured by series connection of a diode 14, a first Zener diode 15, a first clamp voltage compensation circuit unit 20a, a second clamp voltage compensation circuit unit 20b, . . . , and an n-th clamp voltage compensation circuit unit 20n.

The first clamp voltage compensation circuit unit 20a is configured by parallel connection of the second Zener diode 16a and the temperature characteristic compensating element 17a. The second clamp voltage compensation circuit unit 20b is configured by parallel connection of the third Zener diode 16b and the temperature characteristic compensating element 17b. The n-th clamp voltage compensation circuit unit 20n is configured by parallel connection of an n-th Zener diode 16n and a temperature characteristic compensating element 17n. The temperature characteristic compensating elements 17a, 17b, . . . , and 17n have temperature coefficient polarities different from those of the first Zener diode 15, the second Zener diode 16a, and the n-th Zener diode 16n.

In the second embodiment, the temperature at which the magnitude relationship between the Zener voltage VZD2a of the second Zener diode 16a in the first clamp voltage compensation circuit unit 20a and the voltage drop VNTCa generated in the temperature characteristic compensating element 17a changes is different from the temperature at which the magnitude relationship between the Zener voltage VZD2b of the third Zener diode 16b in the second clamp voltage compensation circuit unit 20b and the voltage drop VNTCb generated in the temperature characteristic compensating element 17b changes.

Figure 5:
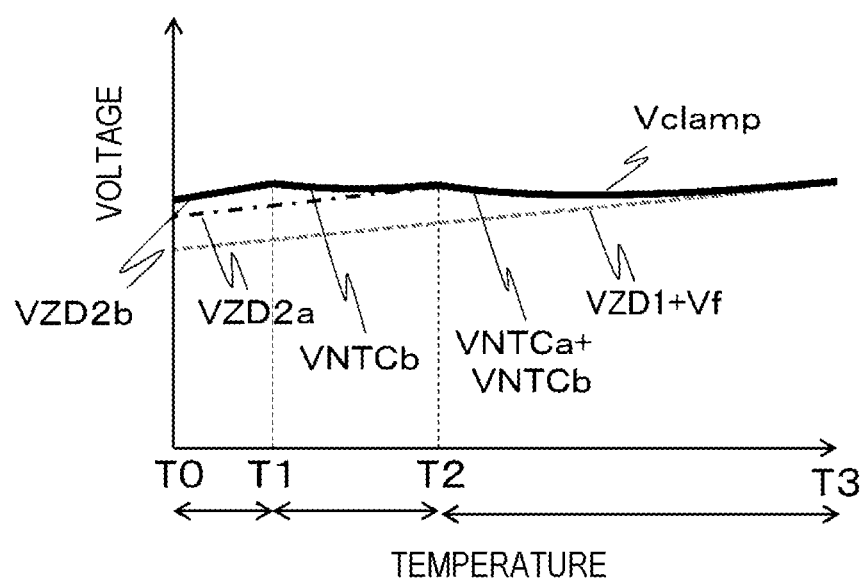
FIG. 5 is a diagram illustrating temperature characteristics of a clamp voltage according to the second embodiment.

FIG. 5 is a diagram illustrating a temperature characteristic of a clamp voltage according to the second embodiment. In FIG. 2, the horizontal axis represents temperature, and the vertical axis represents voltage.

Hereinafter, in order to simplify the description, a case where the surge voltage protection circuit 20 is configured by series connection of the diode 14, the first Zener diode 15, the first clamp voltage compensation circuit unit 20a, and the second clamp voltage compensation circuit unit 20b will be described as an example.

As illustrated in FIG. 5, when the component temperatures of the first to second clamp voltage compensation circuit units 20a to 20b are low at T0 to T1, the voltage drop VNTCa generated in the temperature characteristic compensating element 17a is larger than the Zener voltage VZD2a of the second Zener diode 16a. In addition, the voltage drop VNTCb generated in the temperature characteristic compensating element 17b is larger than the Zener voltage VZD2b of the third Zener diode 16b. Therefore, the current flowing through the surge voltage protection circuit 20 flows through the second Zener diode 16a and the third Zener diode 16b. Therefore, the clamp voltage Vclamp is the sum of the Zener voltage VZD1 of the first Zener diode 15a, the Zener voltage VZD2a of the second Zener diode 16a, and the Zener voltage VZD2b of the third Zener diode 16b, and is calculated by following Equation (3).

$$Vclamp=Vf+VZD1+VZD2a+VZD2b\ldots \quad (3)$$

When the component temperatures of the first to second clamp voltage compensation circuit units 20a to 20b increase to T1 to T2 as illustrated in FIG. 5, the voltage drop VNTCa generated in the temperature characteristic compensating element 17a is larger than the Zener voltage VZD2a of the second Zener diode 16a. In addition, the voltage drop VNTCb generated in the temperature characteristic compensating element 17b is smaller than the Zener voltage VZD2b of the third Zener diode 16b. Therefore, the current flowing through the surge voltage protection circuit 20 flows through the second Zener diode 16a and the temperature characteristic compensating element 17b. Therefore, the clamp voltage Vclamp is the sum of the Zener voltage VZD1 of the first Zener diode 15a, the Zener voltage VZD2a of the second Zener diode 16a, and the voltage drop VNTCb generated in the temperature characteristic compensating element 17b, and is calculated by following Equation (4).

$$Vclamp=Vf+VZD1+VZD2a+VNTCb\ldots \quad (4)$$

As illustrated in FIG. 5, when the component temperatures of the first to second clamp voltage compensation circuit units 20a to 20b are high at T2 to T3, the voltage drop VNTCa generated in the temperature characteristic compensating element 17a is smaller than the Zener voltage VZD2a of the second Zener diode 16a. In addition, the voltage drop VNTCb generated in the temperature characteristic compensating element 17b is smaller than the Zener voltage VZD2b of the third Zener diode 16b. Therefore, the current flowing through the surge voltage protection circuit 20 flows through the temperature characteristic compensating element 17a and the temperature characteristic compensating element 17b. Therefore, the clamp voltage Vclamp is the sum of the Zener voltage VZD1a of the first Zener diode 15a, the voltage drop VNTCa generated in the temperature characteristic compensating element 17a, and the voltage drop VNTCb generated in the temperature characteristic compensating element 17b, and is calculated by following Equation (5).

$$Vclamp=Vf+VZD1+VNTCa+VNTCb\ldots \quad (5)$$

As a result, the clamp voltage is switched a plurality of times when the component temperatures of the first to second clamp voltage compensation circuit units 20a to 20b change, so that fluctuation of the clamp voltage is further suppressed. Although the first to second clamp voltage compensation circuit units 20a to 20b have been described, the same applies to a case where a plurality of clamp voltage compensation circuit units are connected in series, and fluctuation of the clamp voltage can be further suppressed.

Figure 6:
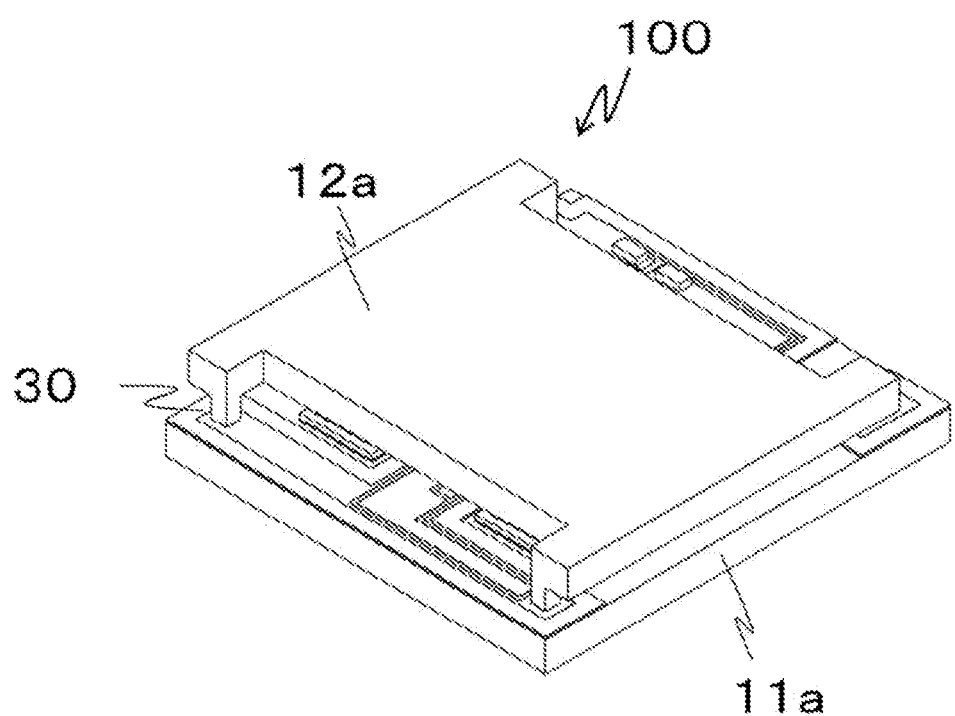
FIG. 6 is an external view illustrating a mounting structure of the semiconductor device.

FIG. 6 is an external view illustrating a mounting structure of the semiconductor device 100. This external view will be described by taking the external view of the semiconductor device 100 according to the first embodiment shown in FIG. 1 as an example, but the same applies to the external view of the semiconductor device 100' according to the second embodiment shown in FIG. 4.

A positive electrode side terminal conductor 11a is disposed on the lowermost surface of a substrate 30, and is formed of a conductor having small electric resistance and small thermal resistance, such as copper or aluminum. A negative electrode side terminal conductor 12a is disposed on the uppermost surface of the substrate 30, and is formed of a conductor such as copper or aluminum.

Figure 7:
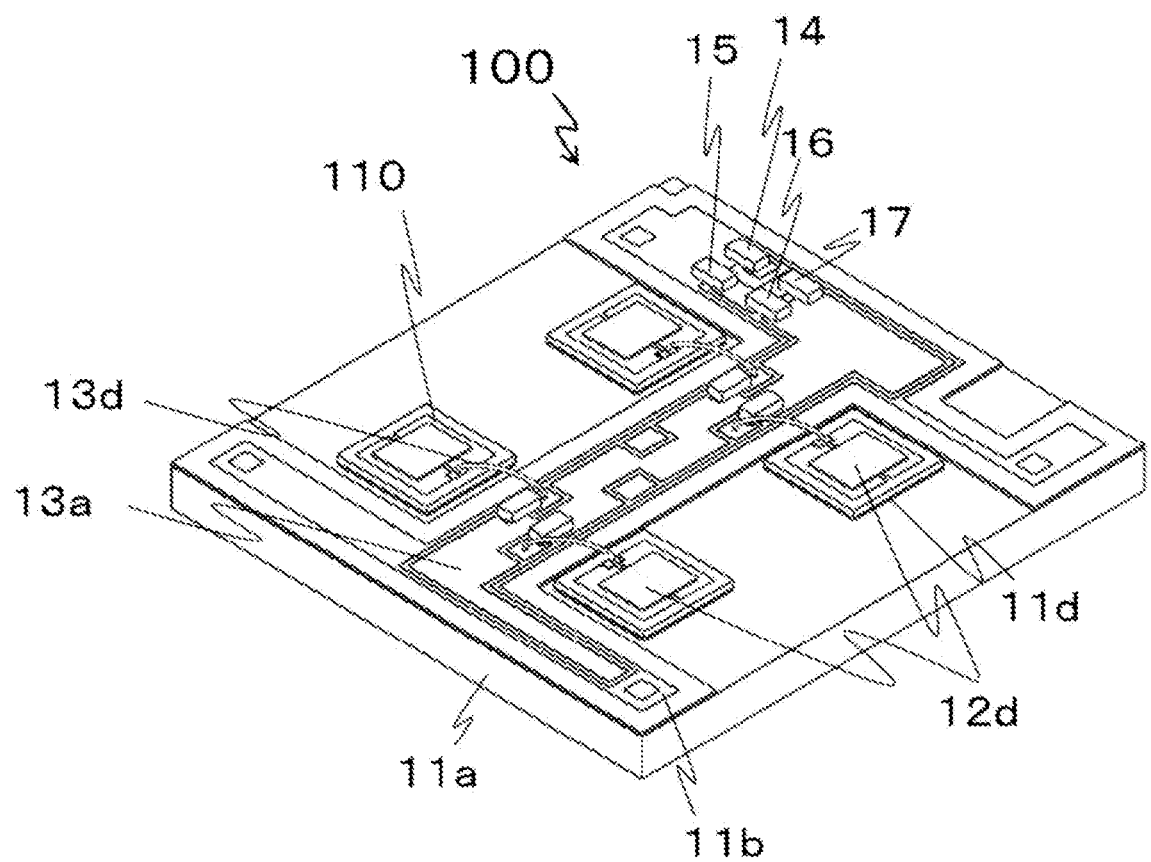
FIG. 7 is a view illustrating an internal structure of the semiconductor device.

FIG. 7 is a view illustrating an internal structure of the semiconductor device 100, and illustrates a state in which the negative electrode side terminal conductor 12a illustrated in FIG. 6 is removed.

A positive electrode side terminal conductor insulating layer 11b is disposed on the upper surface of the positive electrode side terminal conductor 11a, and the positive electrode side terminal conductor insulating layer 11b is formed of an insulating resin, ceramic, or the like. A control signal layer 13a and the like are disposed on the upper surface of the positive electrode side terminal conductor insulating layer 11b, and this is formed of a conductor such as copper. In addition, the switching element 110 is disposed on the upper surface of the positive electrode side terminal conductor 11a, and the positive electrode side terminal conductor 11a and the positive electrode side terminal 11 (see FIG. 1) of the switching element 110 are joined by a positive electrode side terminal joining material 11d such as solder. On the other hand, a negative electrode side terminal 12 (see FIG. 1) of the switching element 110 is joined to a negative electrode side terminal 12 (not shown) by a negative electrode side terminal joining material 12d such as solder. At this time, the maximum output current of the semiconductor element can be increased by connecting the switching elements 110 in multi-parallel.

The control terminal 13 (see FIG. 1) of the switching element 110 is connected to the control signal layer 13a by a control signal line 13d such as a bonding wire, and the diode 14, the first Zener diode 15, the second Zener diode 16, and the temperature characteristic compensating element 17 constituting the surge voltage protection circuit 10 are soldered to the control signal layer 13a. That is, the switching element 110 and the surge voltage protection circuit 10 (diode 14, first Zener diode 15, second Zener diode 16, and temperature characteristic compensating element 17) are formed on the same substrate. At this time, in the semiconductor device 100, by arranging the first Zener diode 15, the second Zener diode 16, and the temperature characteristic compensating element 17 so as to be close to each other, it is possible to reduce a variation in temperature of each component, and it is possible to suppress a variation in electrical characteristics.

Figure 8:
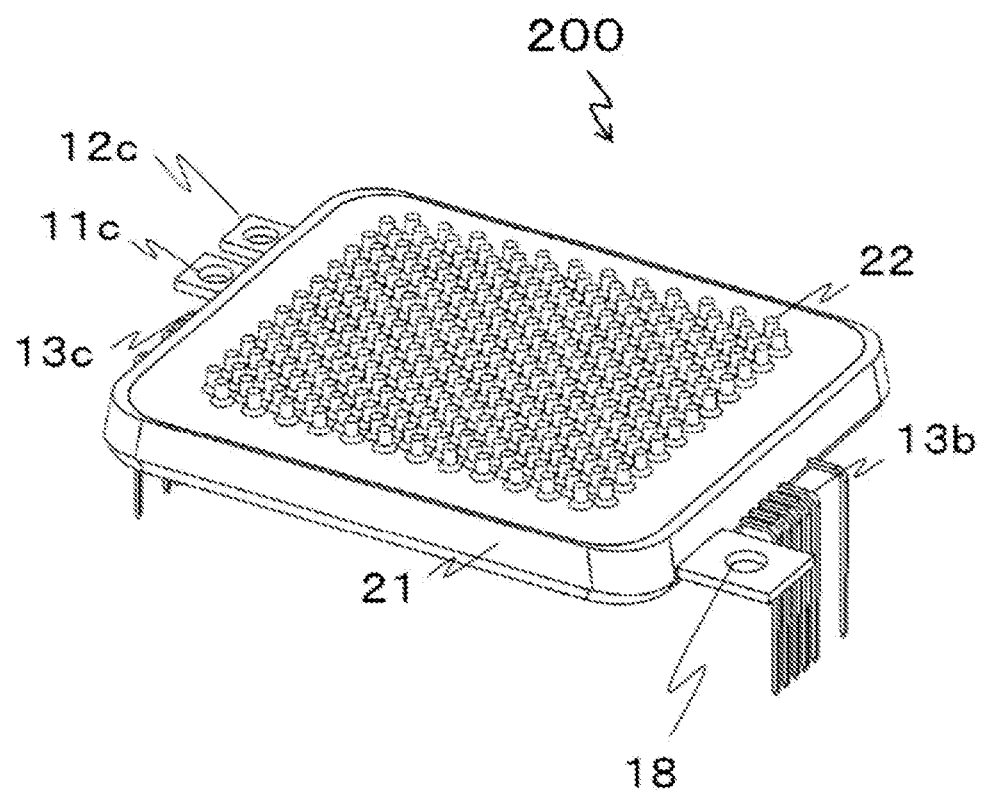
FIG. 8 is an external view of a power module incorporating the semiconductor device.

FIG. 8 is an external view of a power module 200 incorporating the semiconductor device 100.

The signal lines from the internal semiconductor device 100 are collected as a lower arm control signal line 13c and an upper arm control signal line 13b. The upper arm positive electrode side terminal 11c, the lower arm negative electrode side terminal 12c, and the upper surface of the upper arm negative electrode terminal/lower arm positive electrode terminal 18 are joined to a heat dissipation fin 22 by a joining material having low thermal resistance such as solder. The side surface is molded with a resin 21 to prevent mixing of foreign substances and improve the withstand voltage.

Figure 9:
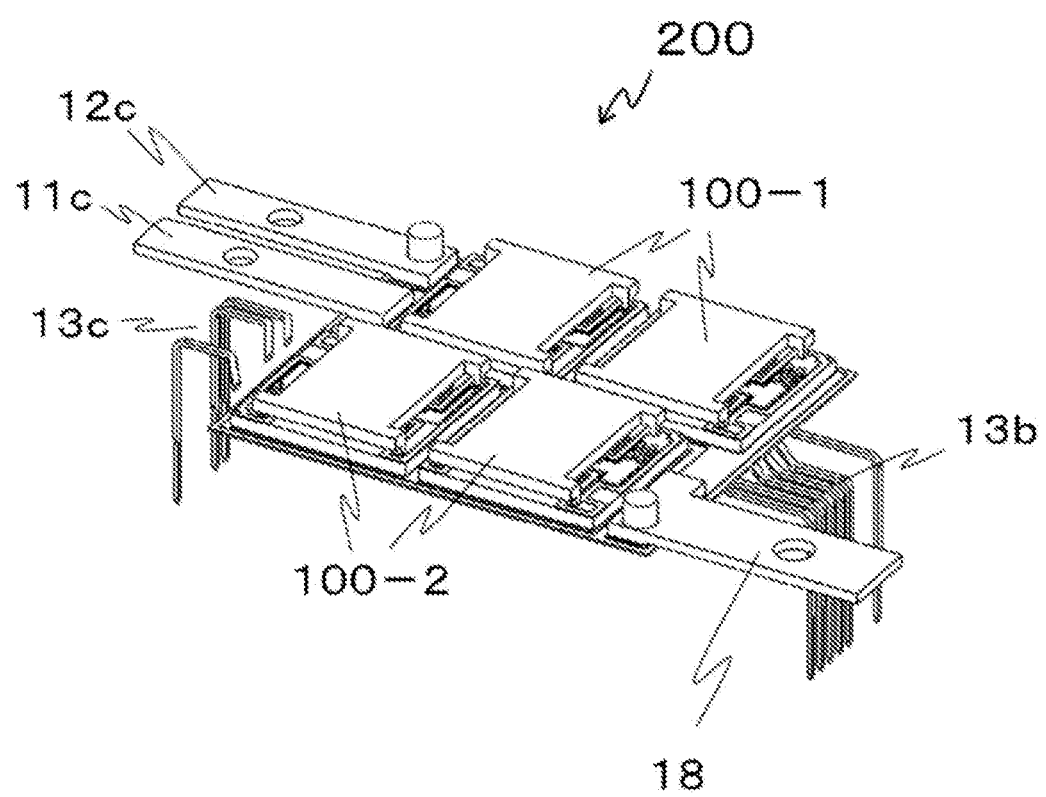
FIG. 9 is a view illustrating an internal structure of the power module.

FIG. 9 is a view illustrating an internal structure of the power module 200, and is a view illustrating a state in which the heat dissipation fin 22 and the resin 21 illustrated in FIG. 8 are removed.

FIG. 9 illustrates an example in which two semiconductor devices 100-1 used as the upper arm and two semiconductor devices 100-2 used as the lower arm are provided. The positive electrode side terminal conductor 11a (see FIG. 7) of the upper arm is connected to the upper arm positive electrode side terminal 11c by a joining material such as solder. The negative electrode side terminal of the upper arm (see FIG. 1) and the positive electrode side terminal of the lower arm (see FIG. 1) are connected to the upper arm negative electrode terminal/lower arm positive electrode terminal 18. The negative electrode side terminal (see FIG. 1) of the lower arm is connected to the lower arm negative electrode side terminal 12c. In order to reduce the wiring inductance, the upper arm positive electrode side terminal 11c and the lower arm negative electrode side terminal 12c are arranged close to each other. The control terminals (see FIG. 1) of the upper arm and the lower arm are connected to the upper arm control signal line 13b and the lower arm control signal line 13c, respectively.

In the first and second embodiments, since the surge voltage protection circuit 10, 20 that suppresses the fluctuation of the clamp voltage can be arranged in the immediate vicinity of the switching element 110, the wiring inductance of the surge voltage protection circuit 10, 20 can be reduced, and the response speed when clamping the surge voltage can be improved. In addition, since a control device such as a microcomputer is not required for the surge voltage protection circuit 10, 20 that suppresses the fluctuation of the clamp voltage, the surge voltage protection circuit can be downsized and can be mounted inside the semiconductor device 100, 100' or the power module 200.

Figure 10:
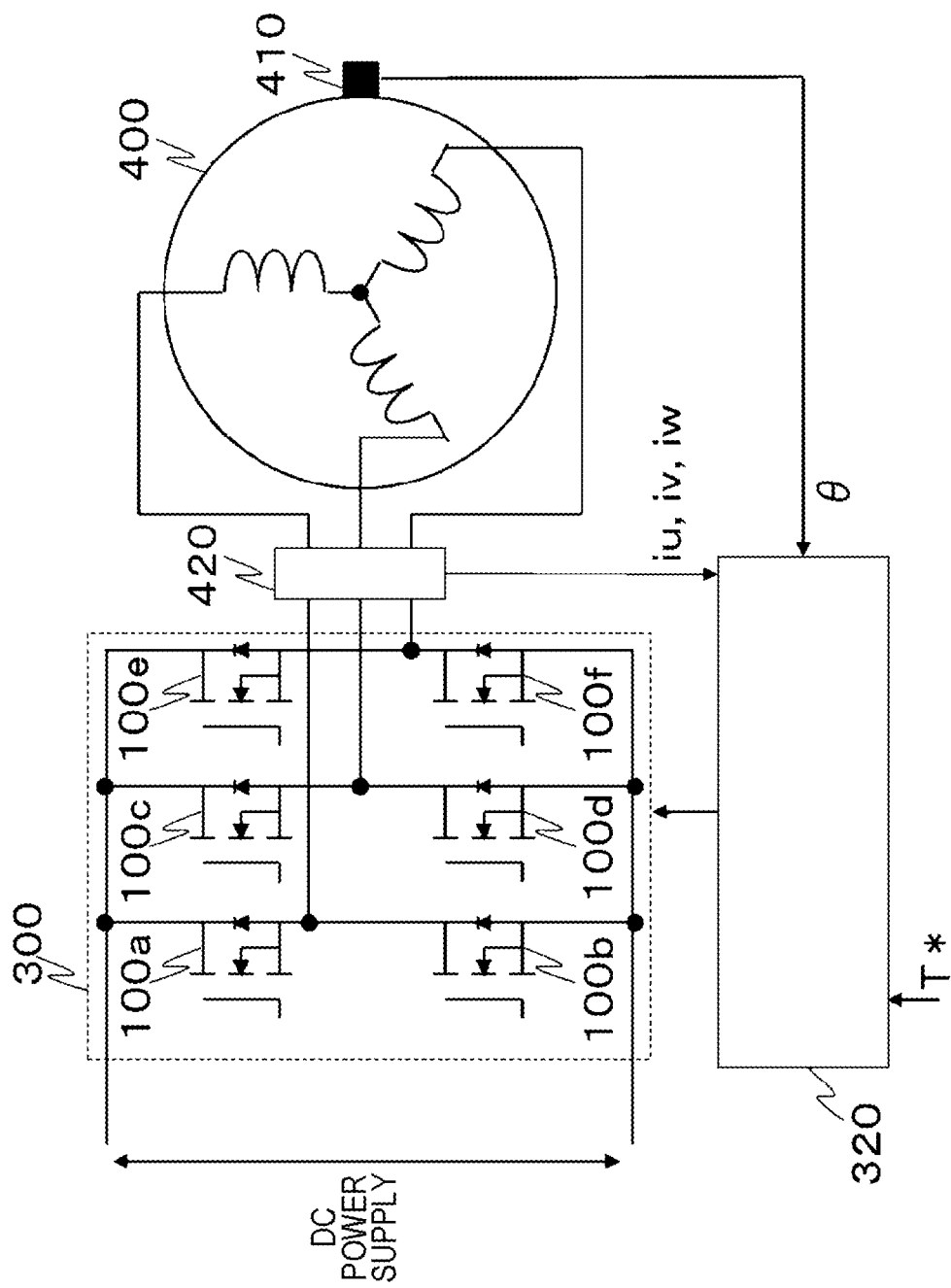
FIG. 10 is a diagram illustrating a drive circuit of a motor using an inverter device.

FIG. 10 is a diagram illustrating a drive circuit of a motor 400 using an inverter device 300.

The drive circuit includes an inverter device 300, an inverter control device 320, a motor 400, a position sensor 410, and a current sensor 420.

The inverter control device 320 performs PWM control of the inverter device 300 on the basis of a torque command T* from the outside, three-phase currents iu, iv, and iw detected by the current sensor 420, and a rotor position θ detected by the position sensor 410.

The inverter device 300 includes semiconductor devices 100a to 100f. Each of the semiconductor devices 100a to 100f is a semiconductor device 100 incorporating the switching element 110 and the surge voltage protection circuit 10 illustrated in FIG. 1. Alternatively, each of the semiconductor devices 100a to 100f is a semiconductor device 100' incorporating the switching element 110 and the surge voltage protection circuit 20 illustrated in FIG. 4.

The semiconductor device 100a is disposed in a U-phase upper arm, the semiconductor device 100b is disposed in a U-phase lower arm, the semiconductor device 100c is disposed in a V-phase upper arm, the semiconductor device 100d is disposed in a V-phase lower arm, the semiconductor device 100e is disposed in a W-phase upper arm, and the semiconductor device 100f is disposed in a W-phase lower arm.

In the semiconductor devices 100a to 100f, the switching element 110 is turned on or off based on the switching signal generated by the inverter control device 320, and the DC voltage applied from the DC power supply is converted into the AC voltage. The converted AC voltage is applied to the stator of the motor 400 to generate a three-phase AC current. This three-phase AC current generates a rotating magnetic field in the motor 400, and the rotor rotates.

The position sensor 410 detects the position of the rotor of the motor 400 and outputs the detected rotor position θ to the inverter control device 320. The current sensor 420 detects a current flowing through the motor 400 and outputs the detected three-phase currents iu, iv, and iw to the inverter control device 320.

Figure 11:
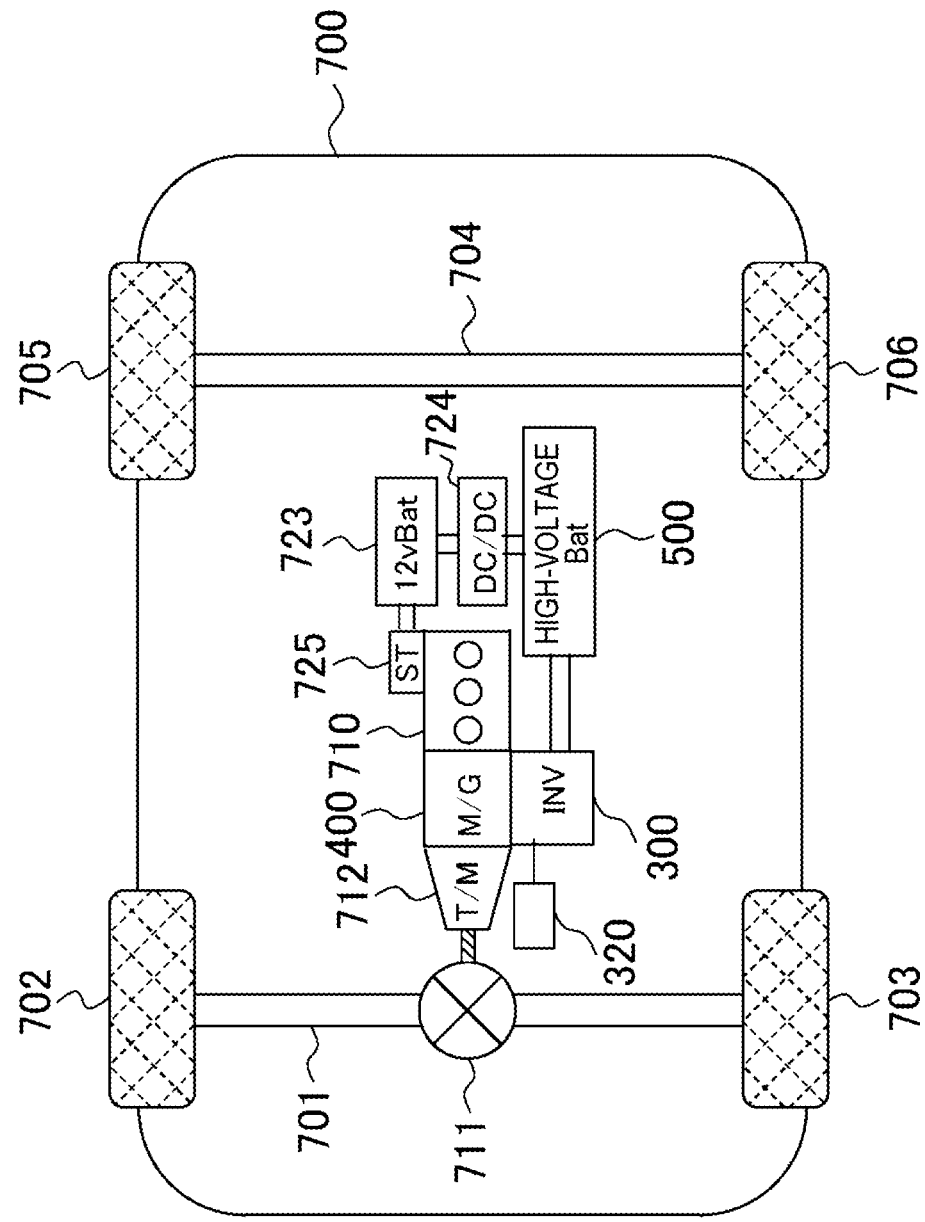
FIG. 11 is a diagram illustrating a configuration of an electric vehicle.

FIG. 11 is a diagram illustrating a configuration of an electric vehicle.

In the electric vehicle illustrated in FIG. 11, the inverter device 300 is mounted on a vehicle body 700 of a hybrid electric automobile to drive the motor 400. The inverter device 300 includes the semiconductor device 100 or the semiconductor device 100' described in each of the first and second embodiments.

The inverter device 300 operates based on a switching signal output from the inverter control device 320, and performs power conversion from DC power to AC power. The motor 400 is driven using AC power output from the inverter device 300. As a result, the electric vehicle travels using the driving force of the motor 400. Furthermore, the motor 400 operates not only as an electric motor that generates a rotational driving force but also as a generator that generates power by receiving the driving force. That is, the electric vehicle is a power train in which the motor 400 is applied as a motor/generator.

A front wheel axle 701 is rotatably supported on a front portion of the vehicle body 700, and front wheels 702 and 703 are provided at both ends of the front wheel axle 701. A rear wheel axle 704 is rotatably supported on a rear portion of the vehicle body 700, and rear wheels 705 and 706 are provided at both ends of the rear wheel axle 704. The front wheel axle 701 is provided with a differential gear 711 which is a power distribution mechanism, and distributes the rotational driving force transmitted from an engine 710 via a transmission 712 to the left and right front wheel axles 701.

The output shaft of the engine 710 is mechanically coupled to the output shaft of the motor 400 directly or via the transmission 712. As a result, the rotational driving force of the motor 400 can be transmitted to the engine 710, and the rotational driving force of the engine 710 can be transmitted to the motor 400.

In the motor 400, the three-phase AC power controlled by the inverter device 300 is supplied to the stator coil of the stator, whereby the rotor rotates and generates a rotational driving force according to the three-phase AC power. That is, while the motor 400 is controlled by the inverter device 300 to operate as an electric motor, the electromotive force is induced in the stator coil of the stator by the rotation of the rotor by receiving the rotational driving force of the engine 710, and the motor operates as a generator that generates three-phase AC power.

The inverter device 300 converts DC power supplied from a high-voltage battery 500, which is a DC power supply of a high-voltage system (for example, 300 V), into three-phase AC power, and controls three-phase AC current flowing through the stator coil of the motor 400 according to the magnetic pole position of the rotor according to the operation command value.

The three-phase AC power generated by the motor 400 is converted into DC power by the inverter device 300 to charge the high-voltage battery 500. The high-voltage battery 500 is electrically connected to a low-voltage battery 723 via a DC-DC converter 724. The low-voltage battery 723 constitutes a DC power supply for a low-voltage system (for example, 12 V) of an automobile, and is used as a power supply for a starter 725 for initially starting (cold starting) the engine 710 and auxiliary machines such as a radio and a light.

When the electric vehicle is at vehicle stop such as waiting for a traffic light (idle stop mode), the engine 710 is stopped, and when the engine 710 is restarted (hot start) at the time of re-departure, the motor 400 is driven by the inverter device 300 to restart the engine 710. However, when the amount of charge of the high-voltage battery 500 is insufficient or when the engine 710 is not sufficiently warmed, it is preferable to continue driving without stopping the engine 710 even in the idle stop mode. Further, during the idle stop mode, it is necessary to secure a drive source of auxiliary machines using the engine 710 as a drive source, such as a compressor of an air conditioner. In this case, the motor 400 may be driven instead of the engine 710 to serve as a drive source for auxiliary machines.

On the other hand, when the electric vehicle is in the acceleration mode or the high-load operation mode, the motor 400 is driven to assist the driving of the engine 710. Conversely, when the high-voltage battery 500 is in the charging mode requiring charging, the engine 710 causes the motor 400 to generate power to charge the high-voltage battery 500. Furthermore, at the time of braking or decelerating the electric vehicle, as the regeneration mode, the motor 400 may be caused to generate power by kinetic energy of the electric vehicle to charge the high-voltage battery 500.

In the electric vehicle according to the present embodiment, the motor 400 that generates the driving force of the vehicle body 700 is controlled by the inverter device 300, and the inverter device 300 is protected from the surge voltage by the surge voltage protection circuit 10, 20.

Therefore, since the fluctuation of the clamp voltage Vclamp due to the temperature change of the surge voltage protection circuit 10, 20 is suppressed by the second Zener diode 16, the temperature characteristic compensating element 17, and the like, it is possible to reduce the margin of the clamp voltage with respect to the element withstand voltage of the switching element 110 when designing the surge voltage protection circuit 10, 20. Therefore, the switching element 110 operates at a clamp voltage at which an appropriate margin is secured with respect to the element withstand voltage of the switching element 110 regardless of the component temperature of the surge voltage protection circuit 10, 20, so that the switching time is shortened and the switching loss is reduced.

As a result, since the amount of heat generated in the inverter device 300 during traveling is reduced, the cooling mechanism can be downsized, and the inverter device 300 and the radiator can be downsized. Furthermore, since the loss generated in the inverter device 300 is reduced, the power consumption amount is reduced, and the fuel consumption of the electric vehicle is improved.

In addition, since the switching loss generated in the inverter device 300 is reduced, the maximum switching frequency can be increased without improving the cooling performance of the inverter device 300. As a result, since the frequency of the voltage ripple generated in the DC voltage unit of the inverter device 300 is increased, the capacitance of the input voltage smoothing capacitor connected in parallel with the power input terminal of the inverter device 300 can be reduced and downsized. Furthermore, since the maximum output frequency of the inverter device 300 can be increased, the maximum rotation speed of the motor 400 can be increased. As a result, the motor 400 is downsized along with high-speed rotation, and the degree of freedom in mounting to the electric vehicle is increased, so that the space inside the vehicle can be expanded.

According to the embodiments described above, the following operational effects can be obtained.

(1) The semiconductor device 100, 100' includes a switching element 110 that is on-off controlled, and a surge voltage protection circuit 10, 20 connected between a positive electrode side terminal of the switching element 110 and a control terminal of the switching element 110. The surge voltage protection circuit 10, 20 includes a first Zener diode 15, a second Zener diode 16 connected in series with the first Zener diode 15, and a temperature characteristic compensating elements 17 having a temperature coefficient different in polarity from the first Zener diode 15, and the second Zener diode 16, and connected in parallel with the second Zener diode 16. As a result, it is possible to suppress variation in the clamp voltage regardless of the current value.

The present invention is not limited to the above-mentioned embodiments, and other forms conceivable within the scope of the technical idea of the present invention are also included in the scope of the present invention as long as the characteristics of the present invention are not impaired.

REFERENCE SIGNS LIST 10, 20 surge voltage protection circuit
11 positive electrode side terminal
12 negative electrode side terminal
13 control terminal
14 diode
15 first Zener diode
16 second Zener diode
17 temperature characteristic compensating element
21 resin
22 heat dissipation fin
100, 100' semiconductor device
100a U-phase upper arm semiconductor device
100b U-phase lower arm semiconductor device
100c V-phase upper arm semiconductor device
100d V-phase lower arm semiconductor device
100e W-phase upper arm semiconductor device
100f W-phase lower arm semiconductor device
110 switching element
300 inverter device
320 inverter control device
400 motor
410 position sensor
420 current sensor
700 vehicle body 701 front wheel axle
702, 703 front wheel
704 rear wheel axle
705, 706 rear wheel
710 engine
711 differential gear
712 transmission
723 low voltage battery
724 DC-DC converter
725 starter
VZD1 Zener voltage of first Zener diode
VZD2 Zener voltage of second Zener diode
VNTC voltage drop of temperature characteristic compensating element
Vclamp clamp voltage
$i_u$ U-phase current detection value
$i_v$ V-phase current detection value
$i_w$ W-phase current detection value
T* torque command value
ω angular velocity
θ rotor position

The invention claimed is:

1. A semiconductor device comprising:
 a switching element that is on-off controlled; and
 a surge voltage protection circuit connected between a positive electrode side terminal of the switching element and a control terminal of the switching element, wherein
 the surge voltage protection circuit includes a first Zener diode, a second Zener diode connected in series with the first Zener diode, and a temperature characteristic compensating element having a temperature coefficient different in polarity from the first Zener diode and the second Zener diode and connected in parallel with the second Zener diode.

2. The semiconductor device according to claim 1 further comprising:
 at least one additional temperature characteristic compensating element,
 wherein
 the surge voltage protection circuit includes: a plurality of Zener diodes each having a different Zener voltage from the second Zener diode and connected in series with the second Zener diode; and the plurality of the temperature characteristic compensating elements each having a temperature coefficient different in polarity from the first Zener diode, the second Zener diode, and the plurality of Zener diodes and connected in parallel to each of the plurality of Zener diodes.

3. The semiconductor device according to claim 1, wherein
 a Zener voltage of the second Zener diode is lower than a Zener voltage of the first Zener diode.

4. The semiconductor device according to claim 1, wherein
 the temperature characteristic compensating element is a thermistor.

5. A power module comprising the semiconductor device according to claim 1, wherein
 the switching element and the surge voltage protection circuit are formed on a same substrate.

6. An inverter device comprising the power module according to claim 5, wherein the inverter device converts a DC voltage into an AC voltage.

7. An electric vehicle comprising the inverter device according to claim 6, wherein a motor is driven by the AC voltage.

* * * * *